Patent …

United States Patent [19]

Stock

[11] Patent Number: 4,582,080

[45] Date of Patent: Apr. 15, 1986

[54] BIDIRECTIONAL CRYOGENIC VALVES

[75] Inventor: Richard W. Stock, Fullerton, Calif.

[73] Assignee: Lear Siegler, Inc., Santa Monica, Calif.

[21] Appl. No.: 636,861

[22] Filed: Aug. 1, 1984

Related U.S. Application Data

[63] Continuation-in-part of Ser. No. 485,177, Apr. 15, 1983, abandoned.

[51] Int. Cl.$^4$ ............................................. F16K 1/226
[52] U.S. Cl. ...................................... 137/74; 251/173; 251/174; 251/307; 251/317; 251/362; 251/363; 277/213; 277/235 A
[58] Field of Search ............... 137/72, 74; 251/173, 251/174, 307, 317, 362, 363; 277/235 R, 235 A, 207 R, 213

[56] References Cited

U.S. PATENT DOCUMENTS

| | | | |
|---|---|---|---|
| 2,648,582 | 8/1953 | Phillips | 277/213 |
| 3,033,582 | 5/1962 | Creavey | 277/207 X |
| 3,394,915 | 7/1968 | Gachot | 251/315 X |
| 3,650,508 | 3/1972 | Kosmala | 251/173 X |
| 4,022,948 | 5/1977 | Smith | 277/235 R |
| 4,244,387 | 1/1981 | Snape | 137/72 |
| 4,341,233 | 7/1982 | Broadway | 137/72 |
| 4,373,543 | 2/1983 | Brown | 137/74 |

*Primary Examiner*—Harold W. Weakley
*Attorney, Agent, or Firm*—Edward J. DaRin

[57] ABSTRACT

A bidirectional valve useful at all temperatures from cryogenic to extreme fire temperatures. The sealing means for the bidirectional valve comprises a metallic sealing element having a pair of spaced sealing lobes defined thereon which are coated with a Teflon compound. A third sealing lobe is defined on the metallic sealing element between the pair of sealing lobes and is constructed solely of metal. A pair of coated sealing lobes further function as wipers to prevent sand, dirt or similar foreign particles from becoming crushed between the valve disc and metallic sealing lobe during the final closing of the valve. When the valve is exposed to fire conditions, the Teflon coated sealing lobes melt out leaving the metallic lobe as the fire safe sealing lobe.

18 Claims, 5 Drawing Figures

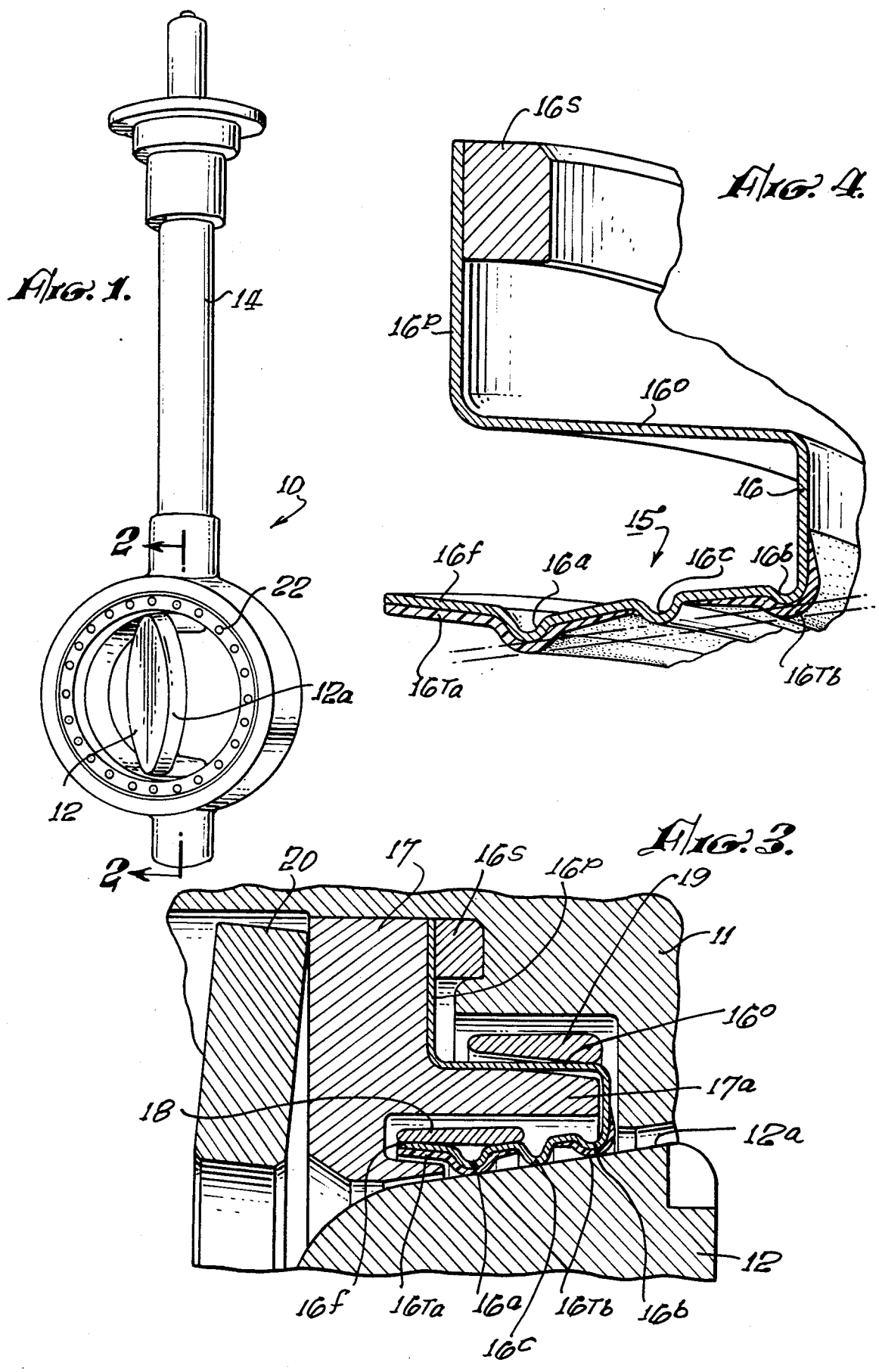

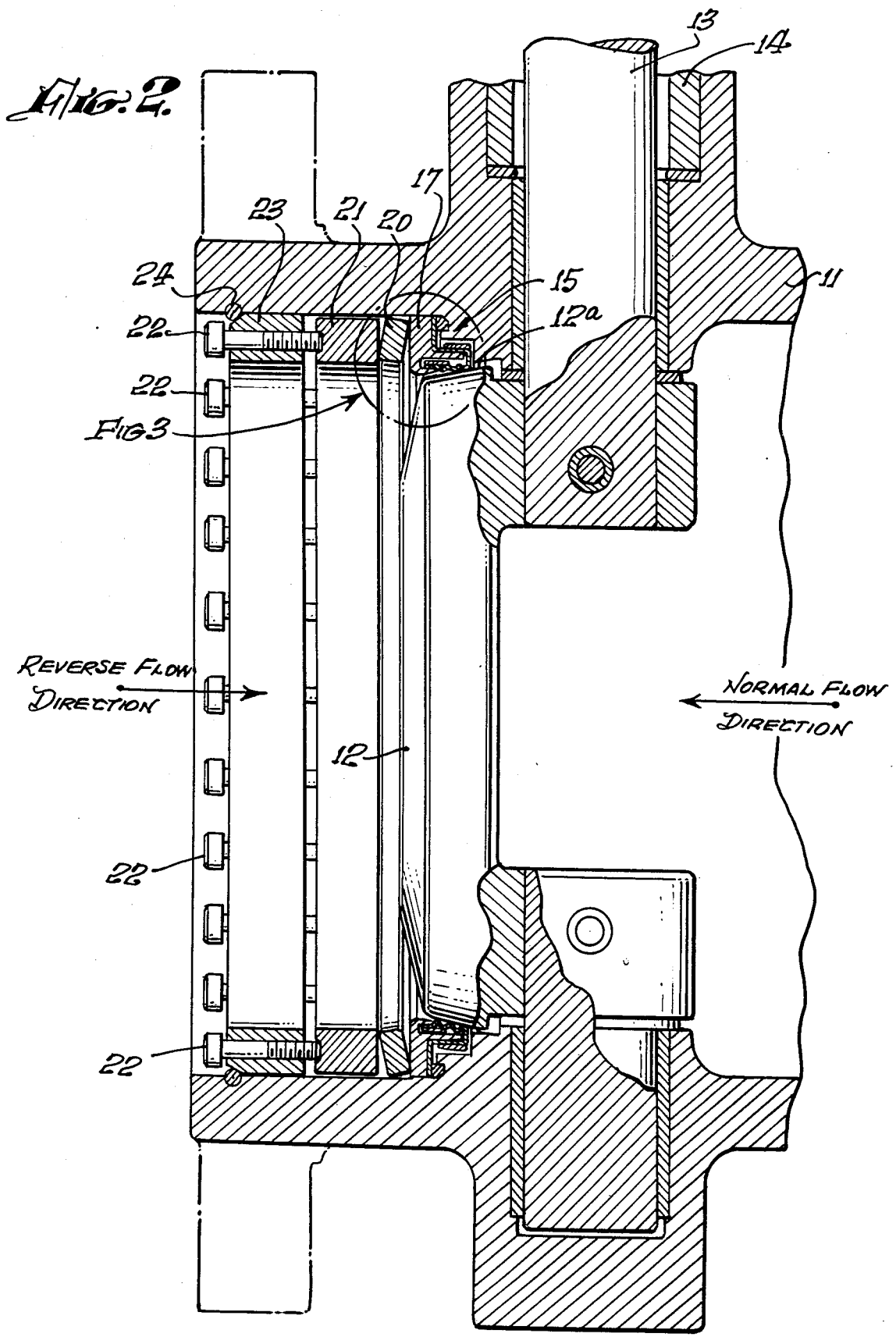

BIDIRECTIONAL CRYOGENIC VALVES

This application is a continuation-in-part of my co-pending application bearing Ser. No. 485,177, filed on 4/15/83, now abandoned, and entitled BIDIRECTIONAL CRYOGENIC VALVES and assigned to the same assignee as the present application.

FIELD OF INVENTION

This invention relates to a sealing means for bidirectional cryogenic valves and, more particularly, to cryogenic and special fluid handling valves having improved sealing means capable of use at all temperatures from cryogenic to extreme fire temperatures.

BACKGROUND OF INVENTION

The present invention is directed to valve structures of the type disclosed in U.S. Pat. No. 3,260,496, and which valve principally utilizes a unilateral sealing means. A bidirectional cryogenic valve structure is disclosed in U.S. Pat. No. 3,650,508 granted on Mar. 21, 1972. These patented structures are particularly adapted for controlling the flow of cryogenic fluids, including liquid and gaseous hydrogen, nitrogen, oxygen, and methane, as well as many other ambient temperature bipropellants and corrosive fluids. The sealing means utilized in such cryogenic valves provided virtually leakproof action. The sealing means principally utilized in these valve structures are constructed entirely of resilient plastic materials, such as Teflon or the like, and are subject to being destroyed by fire conditions at the valve thereby rendering the valve inoperative or subject to leaks. It has been found that sealing means constructed entirely of plastic material require frequent replacement when the valve is used in throttling type service. It has also been found that when such prior art valve sealing structures are utilized for handling liquefied gas, LNG, that the fluid contains sand, dirt, or similar foreign particles that may become crushed between the valve disc sealing means, thereby scratching or damaging the sealing surfaces, both the resilient seal and the disc sealing surface, whereby the sealing qualities of the valve are deteriorated. The problem is particularly troublesome where metallic sealing means are used. The handling of liquefied natural gas, LNG, has been found to be fire prone and LNG valves now must meet the specification of having a fire safe seat in the form of metallic sealing means. Various types of sealing means for these cryogenic and special fluid handling means are available and are presently sold as providing a fire safe seal, including metallic seals. I have no knowledge, however, of a valve structure for an LNG application that is directed to the problem of preventing sand, dirt or similar foreign particles from affecting the sealing qualities of such cryogenic valves.

SUMMARY OF INVENTION

The present invention provides an improved cryogenic butterfly valve having a bidirectional fire safe, metallic seal that is retrofittable to all present day bidirectional butterfly valves of the aforementioned prior art design (U.S. Pat. No. 3,650,508) without any machining being required or modification to the basic valve structure. The present invention is structured to prevent sand, dirt, or similar foreign particles from damaging the sealing properties of the improved metallic seal of the present invention including when it is used in LNG applications and where such foreign particles are normally found, and yet provides exceptional tight sealing capabilities.

From a structural standpoint, the present invention provides an improved bidirectional sealing means for valves constructed in accordance with U.S. Pat. No. 3,650,508. The bidirectional seal of the present invention has a metallic substrate that has a thin layer of thermally sensitive, resilient material bonded to the pair of spaced sealing lobes for the sealing means. A third sealing lobe is defined from the metallic substrate and is arranged between the resiliently covered pair of spaced sealing lobes to provide a fire safe seal and to provide exceptionally tight sealing capabilities with a valve disc.

The specific structural organization of the bidirectional valve comprehending the invention comprises a body member provided with a passageway for fluids, and a valve disc rotatably mounted in the passageway for controlling the flow of fluid therethrough. The valve is provided with a bidirectional metallic sealing means mounted in the passageway of the body member for coaction with the valve disc to seal off the flow of fluids through the body member in both fluid flow directions through the passageway. The sealing means is constructed and defined to have a pair of spaced beadlike projections for sealing engagement with the edge of the valve disc and which beadlike projections are provided with a thin layer of a thermally sensitive resilient material deposited over and along with the sealing surface of the sealing means for engaging the valve disc in a leakproof fashion. This sealing means also includes a third beadlike projection arranged thereon intermediate the pair of spaced beadlike projections and spaced therefrom solely constructed of the metallic substrate for engaging the valve disc when it is moved to a closed position to provide a fire safe beadlike projection for the valve. The valve further includes spring means for mechanically loading the sealing means to effect a bi-directional seal at the beadlike projections, and mechanical responsive spring means mounted adjacent the sealing means and providing a variable sealing load to compensate for the change in resiliency of the bonded plastic material due to temperature changes thereby maintaining leakproof performance even at cryogenic temperature.

BRIEF DESCRIPTION OF THE DRAWINGS

FIG. 1 is a front perspective view of the bidirectional valve embodying the present invention and illustrating the valve disc in an open condition;

FIG. 2 is a cross-sectional view taken along the line 2—2 of FIG. 1;

FIG. 3 is an enlarged cross-sectional view of the sealing structure illustrated in FIG. 2 in the area of the circle marked as FIG. 3;

FIG. 4 is an enlarged view of the valve structure of FIG. 3 with parts omitted to illustrate the sealing structure in its relaxed condition corresponding to a valve open position.

DETAILED DESCRIPTION OF THE INVENTION

Figure 5:
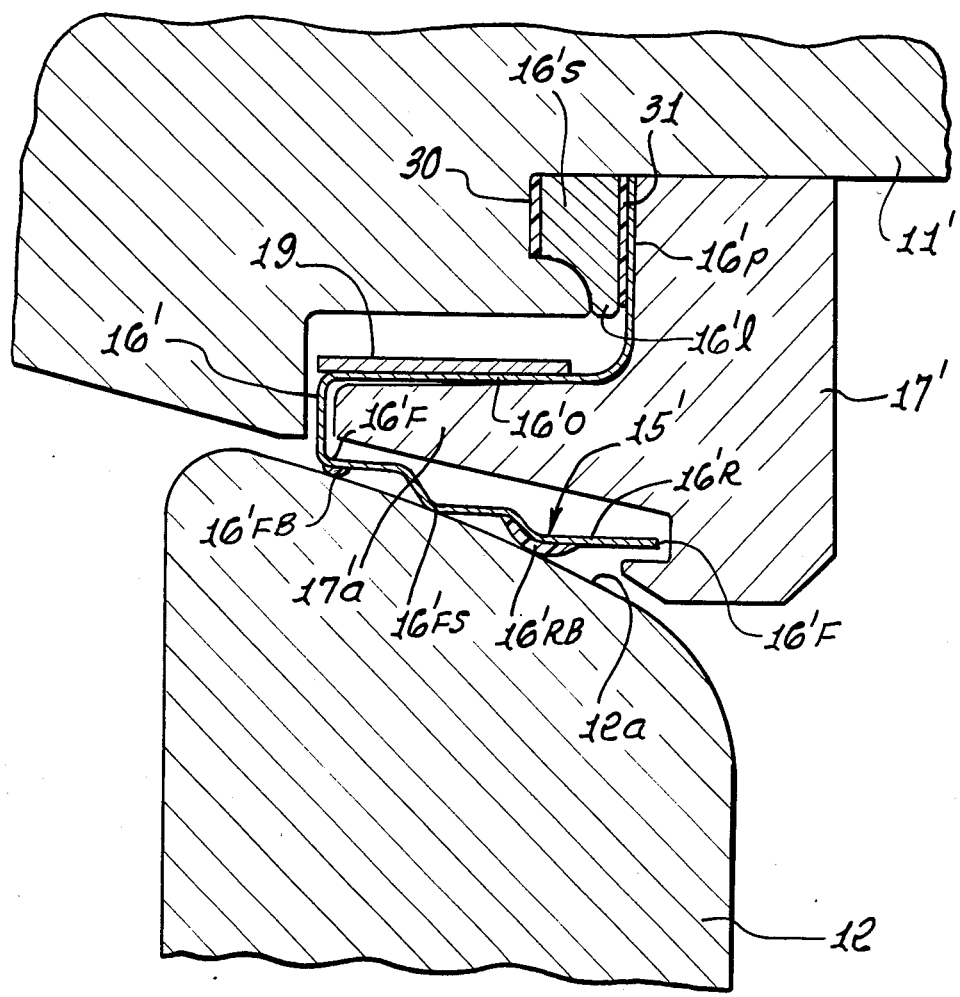
FIG. 5 is an enlarged, partial cross-section of another embodiment of the sealing structure illustrated in FIG. 3 illustrating the valve disc in a closed condition.

Now referring to the drawings, the bidirectional valve 10, which is the subject of the present invention, will be examined in more detail. It should be understood that the overall structural organization of the present invention is the same as that disclosed in U.S. Pat. No. 3,650,508. The present disclosure, then, is directed to the structure of the valve 10 incorporating the improved bidirectional sealing means constructed in accordance with the teachings of the present invention. The bidirectional valve 10 which is the subject of the present invention, will be described as it is embodied in a cryogenic or other special fluid handling valve particularly adapted for handling cryogenic fluids, including liquid and gaseous hydrogen, nitrogen, oxygen, and methane, as well as other ambient temperature bipropellants and corrosive fluids which are compatible with the basic valve materials.

The valve 10 as illustrated in the drawings, comprises a valve body 11 mounting a valve disc 12 secured to a valve operator shaft 13. The operator shaft 13 extends through a torque tube 14 in a conventional fashion. The valve disc 12 is arranged with the bidirectional sealing means of the present invention, which is generally identified by the reference numeral 15. The valve disc 12 is operated in the usual fashion, and can be rotated from a fully closed position to a fully open position. It is illustrated in an open position in FIG. 1 and in a fully closed position in FIGS. 2 and 3. As in the structures disclosed in U.S. Pat. Nos. 3,260,496 and 3,650,508, the valve disc 12 is constructed and defined with a sealing surface 12A that is spherically defined to produce the desired sealing action. The valve disc 12 is preferably constructed as a butterfly type structure and is arranged in a slightly offset relationship to the sealing means 15 as well as being offset from a spherical in a direction perpendicular to the flow, as in the structures of the cryogenic valves constructed in accordance with U.S. Pat. Nos. 3,260,496 and 3,650,508.

The sealing means 15 comprises the sealing element 16 preferably constructed of a stainless steel element. The sealing element 16 is provided with three sealing lobes $16^a$, $16^b$, and $16^c$ to provide exceptional tightness. The sealing surface of element 16, best illustrated in FIGS. 3 and 4, functions as the seal substrate and has deposited along its sealing surface a film of Teflon on the order of 0.015 to 0.020 inches thick. The Teflon coating is deposited over the sealing lobes or beads $16^a$ and $16^b$ of the sealing element 16. These dynamic sealing beads $16^a$ and $16^b$ are arranged on the fluid exposed leg $16^f$ of the sealing element 16 and are adapted to engage the valve disc 12. These beadlike elements $16^a$ and $16^b$ are provided and arranged to engage the sealing surface $12^a$ for the disc 12 when the latter is rotated to a fully closed position, as illustrated in FIG. 3 to effect the bidirectional seal in accordance with the direction of the fluid flow through the valve body 11. A third beadlike element $16^c$ is constructed and defined intermediate the beadlike elements $16^a$ and $16^b$, however, it is not provided with a thin layer of Teflon bonded thereto. In the actual manufacturing technique for providing the Teflon coating to the leg $16^f$, the coating can be electrodeposited or heat press bonded to the entire leg $16^f$, including the portion that extends vertically above the sealing bead $16^b$, and then all of the material on the bead $16c$ proper is removed. The portion of Teflon coating enveloping the sealing bead $16^a$ and the adjacent surfaces of the leg $16^f$ are identified as the coating 16Ta, while the Teflon coating the sealing bead $16^b$ and the adjacent surfaces is the coating 16Tb. This coating 16Tb extends around the leg $16^f$ to the bridging leg between legs $16^o$ and $16^f$, as best illustrated in FIG. 4. The Teflon coating can be either a fluorinated ethylene proplylene, FEP Teflon, or a perfluoroalkoxy, PFA Teflon, material. In the relaxed condition of the sealing leg $16^f$ as illustrated in FIG. 4, the sealing beads $16^a$ and $16^b$ are constructed and defined to extend approximately 0.002 inches below the metallic seating lobe $16^c$. When the valve disc 12 is closed, then, the sealing beads $16^a$ and $16^b$ will "crush" due to the resiliency of the Teflon coating whereby all three sealing beads $16^a$, $16^b$, and $16^c$ will engage the sealing surface $12^a$ of the disc 12 when it is in a closed position.

As is particularly evident from examining FIGS. 3 and 4, it will be seen that the sealing element 16 has a generally U-shaped construction in cross section and comprises the arms $16^f$ and $16^o$ of the U, with an outwardly extending arm $16^p$. In this respect, the sealing element 16 is provided with such a U-shaped configuration; namely, through the provision of the legs $16^o$ and $16^f$ to prevent the sealing elements from blowing out downstream in both fluid flow directions. The sealing leg $16^p$ has a spacer $16^s$ defined at one end to abut the valve body 11 and function as a static seal. This spacer $16^s$ is also provided with a Teflon coating on the order of 0.002 inches thick of the same material as the coatings 16Ta and 16Tb.

A retainer 17 is constructed and defined with a configuration conforming to that of the sealing element 16 for retaining it in the desired position within the valve 10. The retainer 17 is further defined and constructed to limit the radial displacement of the beads $16^a$, $16^b$, and $16^c$ by means of the retaining arm $17^a$. The retaining arm $17^a$ extends into the interior of the U of the sealing element 16 or between the legs $16^f$ and $16^o$, as best viewed in FIG. 3. The coaction of these elements is such that the pressure on top of the outer seal leg $16^o$ plus the mechanical and thermal loading provided by an outer spring 19 affects the seal at the seal bead $16^b$. The outer spring 19 may be in the form of a metallic or aluminum hoop that is stretched around the seal leg $16^o$ and has springlike characteristics to provide the required mechanical and thermal loading at the seal bead $16^b$. This configuration of the seal leg $16^o$ is pressure sensitive under the normal flow direction or the fluid flow direction from right to left, as illustrated in FIG. 2, to effect a seal at seal bead $16^b$. When the fluid flow is in the reverse direction, or from left to right, as illustrated in FIG. 2, pressure from the top of the inner seal leg $16^f$ plus the mechanical and thermal loading by the inner spring 18 effects the seal at the seal bead $16^a$. The inner spring 18 may also be a metal or aluminum hoop that is stretched around the inner seal leg $16^f$ to provide the required mechanical and thermal loading of the seal bead $16^a$. Of course, it will be appreciated that any other means for mechanically loading the sealing element 16 may be employed, as long as such means has a higher thermal coefficient than the expansion of the disc 12.

The configuration of the seal leg $16^f$ is pressure sensitive under the reverse flow direction to effect the seal at seal bead $16^a$. The central sealing element $16^c$ will always make contact with the valve disc 20 in the closed position, which will provide sealing against the disc in the event of a fire, or at all temperatures from cryogenic to fire condition. Also, when the Teflon coating provided for the beads $16^a$ and $16^b$ is destroyed, the sealing bead $16^c$ will still engage the disc 12 in a sealing relationship. The sealing bead $16^c$ is maintained in contact with the disc 12 by means of the springs 18 and 19. The variable sealing load provided by the springs 18 and 19 compensates for the change in resiliency of the bonded plastic material due to temperature changes thereby maintaining leakproof valve performance even at cryogenic temperatures. In certain valve applications, however, the springs 18 and 19 may not be necessary.

The seal means 15 further comprehends a mechanical responsive loading means 20 arranged with the retaining element 17 and the sealing element 16. The mechanically responsive loading means 20 is illustrated as a conventional Belleville spring constructed of aluminum bronze and arranged adjacent the retainer 17. The end of the Belleville spring 20, opposite from the retainer 17, engages a loading ring 21 that is secured by means of conventional fasteners 22, as illustrated in FIG. 2 and are carried by the loading ring 23 and secured by a retaining ring 24. The fasteners 22 have their threaded ends securing the loading ring 21. The important feature of the loading means 20 or Belleville spring is that it provides essentially constant sealing load compensating for the non-uniform expansions and contractions of the adjacent parts during periods of rapid temperature change, such as would occur when a warm valve (i.e. ambient) is suddenly filled with cryogenic fluid. The disclosed combination of static and dynamic sealing means then provide the virtually leakproof seal in both directions of fluid flow without danger of the seal blowing out downstream. The sealing element 16 is also provided with a static sealing portion illustrated in FIG. 3 as the sealing element 16S secured between the retainer 17 and the valve body 11.

In addition to the compensation for the expansion and contraction of the sealing materials comprising the sealing element 16, it is also known that in certain applications that the fluid being processed by the valve 10 may contain sand, dirt, and similar particles. The constructions of the sealing element 16 with the Teflon coated sealing beands $16^a$ and $16^b$ are arranged so that they act as wipers to prevent any sand, dirt and particles from being crushed between the valve disc 12 and the bare metal center bead $16^c$ of the sealing element 16 during the final degrees of valve closing. It is known that the resilient sealing materials function to "sponge up"sand particles, and the like, and are not damaged as are metallic seals. This wiping action will reduce the risk of scratching and damage to the center lobe $16^c$. Accordingly, the center lobe $16^c$ will make contact with the valve disc in the closed position in both directions of fluid flow, while the lobes $16^a$ and $16^b$ will function as forward and reverse seals to provide positive leaktight sealing for the valve 10.

A further advantage of the sealing element 16 of the present invention is that it is retrofittable to all of the present day bidirectional valves constructed in accordance with U.S. Pat. No. 3,650,508. Accordingly, the only additional parts necessary to replace the present day sealing elements would be to provide different size seal springs without any need of machine operations on the valve 10 or to make any further modifications.

Now referring to FIG. 5, the presently preferred embodiment of the sealing structure will be described. The embodiment of FIG. 5 is generally the same as the sealing structure illustrated in FIG. 3 but, in this embodiment, the sealing lobes defined on sealing means 15' have the sealing lobes modified to facilitate the manufacture of the sealing element 16'. The spacer 16S of FIG. 3 has also been modified to improve the static sealing properties thereof and to render it fire retardant. It will be recognized that the mechanical responsive loading means 20 arranged with the retaining element 17 in FIG. 3 is also utilized in the embodiment of FIG. 5 althought it is not illustrated to simplify the consideration of the preferred embodiment.

The sealing element 16' is constructed of a stainless steel element as was the element 16 but is die formed to define the configuration thereof including the sealing lobes to closer tolerances. As in the previous embodiment, the sealing element 16' has a generally U-shaped construction in cross-section and comprises the arms $16'_f$ and $16'_o$ of the U, with an outwardly extending arm $16'_p$. The provision of the legs $16'_f$ and $16'_o$ is to prevent the sealing element from blowing out downstream in both directions. The sealing leg $16'_p$ has spacer $16'_s$ defined at one end to abut the valve body 11' and the retainer 17' and to function as a static seal. In this embodiment, the spacer $16'_s$ is defined with a supporting leg $16'_l$ to prevent the sealing leg $16'_p$ from being overstressed. The adjacent portion of the valve body 11' is configured relative to the supporting leg $16'_l$ for the spacer $16'_s$, as illustrated. The spacer $16'_s$ does not have the Teflon coating of the prior embodiment but in lieu thereof is provided with the fire retardant elements 30 and 31 secured between the spacer $16'_s$ and the valve body 11' and the retainer 17' respectively. The fire retardant elements 30 and 31 preferably are constructed of a commercially available graphite material and comprises a strip of solid, pure graphite material. The material is manufactured by the Union Carbide Corporation and is sold under the trademark "Grafoil". This addition of the fire retardent material renders the valve 10 a pure fire safe system.

The sealing element 16' is constructed and defined with three sealing lobes 16'F, 16'FS, and 16'R on the leg $16'_f$ as in the previous embodiment. In this embodiment the sealing surfaces for the sealing lobes 16'F and 16'R only are provided with sealing bead-like elements of Teflon on the order of 0.015 to 0.020 inches thick. The forward sealing bead-like element is identified as the bead 16'FB and the reverse sealing bead-like element is identified as the bead 16'RB. As in the previous embodiment, the fire safe sealing lobe 16'FS is entirely metallic. The bead-like elements 16'FB and 16'RB are provided and arranged to engage the sealing surface $12^a$ for the disc when the disc is rotated to a fully closed position, as illustrated in FIG. 5, to effect the bidirectional seal. These sealing beads extend slightly below the metallic sealing lobe 16'FS so that when the sealing beads 16'FB and 16'RB "crush" due to the resiliency of the Teflon beads, the metallic sealing lobe 16'FS will also engage the sealing surface $12^a$ of the disc 12 when the disc is in a fully closed position, as in the previous embodiment; see FIG. 5.

The retainer 17' is constructed and defined with a configuration conforming to that of the sealing element 16' for retaining it in the desired position within the valve 10. The retaining arm $17'_a$ is defined to limit the radial displacement of the lobes 16'F, 16'FS and 16'R. The arm $17'_a$ extends into the interior of the U defined by the sealing legs $16'_f$ and $16'_o$. In this embodiment, the forward sealing bead 16'FB is loaded by the provision of the outer spring 19 to provide the seal for forward fluid flow. The lower spring 18 is not utilized or illustrated in FIG. 5 for loading the reverse sealing bead 16'RB as it has been found not to be necessary for most applications but may be required under certain conditions.

The function of the valve, including the embodiment of FIG. 5, is the same as in the previous embodiment for processing fluids containing sand, dirt and similar particles whereby the sealing bead 16′FB and 16′RB function to "sponge up" sand particles and the like and provides a fully fire safe valve.

It should now be evident to those skilled in the art that the present invention has provided an improved cryogenic and special fluid handling valve having improved sealing means that is capable of use at all temperatures from cryogenic to external fire temperatures, and that is used in environments where sand, dirt, etc., may be present in the fluids being controlled by the valve. The use of a metallic substrate coated with a resilient plastic material as the sealing element provides the advantages of both types of sealing material in a simple sealing element. The valve is particularly adapted for cryogenic valves in which large temperature excursions are experienced, and affords an essentially leakproof seal for bidirectional fluid flow without deleterious effects.

I claim:

1. A valve comprising a body member provided with a passageway for fluids, a valve disc rotatably mounted in the passageway for controlling the flow of fluids therethrough; bidirectional, metallic sealing means mounted in the passageway of said body for coaction with the valve disc to seal off the flow of fluid through the body member in both fluid flow directions through the passageway; said sealing means being constructed and defined for bidirectional sealing engagement with the edge of the valve disc, the sealing portion of the metallic sealing means including a thin layer of thermally sensitive, resilient material bonded over the bidirectional sealing surfaces of the metallic sealing means for engaging the valve disc in a leakproof fashion, said sealing means including a metallic portion arranged thereon for engaging the valve disc when it is moved to a closed position to provide a fire safe seal for the valve; and mechanical responsive spring means mounted adjacent the sealing means and providing a sealing load to compensate for any non-uniform expansion and contraction of adjacent parts of the valve during periods of rapid temperature changes to provide an essentially constant sealing load.

2. A valve comprising a body member provided with a passageway for fluids, a valve disc rotatably mounted in the passageway for controlling the flow of fluids therethrough; metallic sealing means mounted in the passageway of said body for coaction with the valve disc to seal off the flow of fluid through the body member in at least a single fluid flow direction through the passageway; said sealing means being constructed and defined to have a first beadlike projection for sealing engagement with the edge of the valve disc; the first beadlike projection of the metallic sealing means having a thin layer of a thermally sensitive, resilient material bonded over said beadlike projection for engaging the valve disc in a leakproof fashion; said sealing means including another beadlike projection arranged thereon adjacent to said first beadlike projection; said another beadlike projection being completely metallic and engaging the valve disc when it is moved to a closed position to provide a fire safe seal for the valve; and mechanical responsive spring means mounted adjacent the sealing means and providing a sealing load to compensate for any non-uniform expansion and contraction of adjacent parts of the valve during periods of rapid temperature changes to provide an essentially constant sealing load.

3. A valve comprising a body member provided with a passageway for fluids, a valve disc rotatably mounted in the passageway for controlling the flow of fluids therethrough; bidirectional, metallic sealing means mounted in the passageway of said body for coaction with the valve disc to seal off the flow of fluid through the body member in both fluid flow directions through the passageway; said sealing means being constructed and defined to have a pair of spaced beadlike projections for sealing engagement with the edge of the valve disc; the sealing portion of the metallic seal means having a thin layer of a thermally sensitive, resilient material bonded over said pair of spaced beadlike projections for engaging the valve disc in a leakproof fashion; said sealing means including a third beadlike projection arranged thereon intermediate the pair of spaced projections and spaced therefrom; said third beadlike projection being completely metallic and engaging the valve disc when it is moved to a closed position to engage a fire safe seal for the valve; said mechanical responsive spring means mounted adjacent the sealing means and providing a sealing load to compensate for any non-uniform expansion and contraction of adjacent parts of the valve during periods of rapid temperature changes to provide an essentially constant sealing load.

4. A valve body comprising a body member provided with a passageway for fluids, a valve disc rotatably mounted in the passageway for controlling the flow of fluids therethrough; bidirectional, metallic core sealing means mounted in the passageway of said body for coaction with the valve disc to seal off the flow of fluid through the body member in both fluid flow directions through the passageway; said sealing means being constructed and defined to have a pair of spaced beadlike projections for sealing engagement with the edge of the valve disc; the sealing portion of the metallic sealing means having a thin layer of a thermally sensitive, resilient material bonded over said pair of spaced beadlike projections for engaging the valve disc in a leakproof fashion; said sealing means including a third beadlike projection arranged thereon and spaced from said pair of beadlike projections, said third beadlike projection being completely metallic and engaging the valve disc when it is moved to a closed position to provide a fire safe seal for the valve; and mechanical responsive spring means mounted adjacent the sealing means and providing a sealing load to compensate for any non-uniform expansion and contraction of adjacent parts of the valve during periods of rapid temperature changes to provide an essentially constant sealing load.

5. A valve as defined in claim 4 including spring means for mechanically loading the sealing means to effect a seal at at least one of said beadlike projections.

6. A valve as defined in claim 4 wherein said valve disc has a spherical sealing surface defined for sealing coaction with the sealing means.

7. A valve as defined in claim 6 wherin the valve disc is a butterfly valve arranged slightly offset from the sealing means.

8. A valve as defined in claim 4 or 7 wherein said pair of spaced beadlike projections extend outwardly of the third beadlike projection when the sealing means is in a nonsealing position to further function as wipers to prevent solid particles in the fluid from being crushed between the valve disc and said third beadlike projection during the final closing of the valve disc to said sealing means.

9. A valve as defined in claim 7 wherein said pair of spaced beadlike projections further function as wipers to prevent said particles in the fluid from being crushed between the valve disc and said third beadlike projection during the final closing of the valve thereby reducing the possibility of damage to said third beadlike projection.

10. A valve as defined in claim 4 wherein said thin layer of thermally sensitive resilient material is constructed of a preselected Teflon material.

11. A valve as defined in claim 10 wherein said mechanical responsive spring means comprises a Belleville spring.

12. A valve as defined in claim 11 including retaining means for said spring means.

13. A valve as defined in claim 4 wherein said sealing means is further constructed and defined to constrain the sealing means from blowing out downstream in both directions of fluid flow.

14. A valve as defined in claim 13 wherein said sealing means has a geometrical configuration for defining unbalanced pressures on the sealing means to render the sealing means pressure sensitive in both directions of fluid flow.

15. A valve as defined in claim 4 including spring means for mechanically and variably loading the sealing means at at least one of said beadlike projections to compensate for the change in resiliency of said resilient sealing means due to temperature changes to thereby maintain leakproof valve performance even at cryogenic temperatures.

16. A valve as defined in claim 15 wherein said spring means comprises individual spring means for mechanically loading each of said beadlike projections.

17. A valve as defined in claim 4 wherein the metallic core sealing means has a U-shaped configuration in cross-section with an outwardly extending arm; retaining means constructed and defined to conform to said configuration of said sealing element and extend into said U-shaped configuration for limiting the radial displacement of the sealing element, means for sealing the outwardly extending arm to said valve body member including fire retardant means.

18. A valve as defined in claim 17 wherein said fire retardant means comprises solid graphite means.

* * * * *